United States Patent

[11] 3,596,247

| [72] | Inventor | Alton B. Eckert, Jr. |
| --- | --- | --- |
| | | Norwalk, Conn. |
| [21] | Appl. No. | 723,680 |
| [22] | Filed | Apr. 24, 1968 |
| [45] | Patented | July 27, 1971 |
| [73] | Assignee | Pitney-Bowes, Inc. |
| | | Stamford, Conn. |

[54] AUTOMATIC REGISTER SETTING APPARATUS
13 Claims, 4 Drawing Figs.

[52] U.S. Cl. .................................................. 340/147,
179/2
[51] Int. Cl. ........................................ H04l 23/00,
H04m 11/08
[50] Field of Search .......................................... 340/147;
179/2 CA, 2 R; 235/101; 178/2

[56] References Cited
UNITED STATES PATENTS

| 2,722,381 | 11/1955 | Komusin | 235/101 |
| --- | --- | --- | --- |
| 2,973,507 | 2/1961 | Gronoin | 178/2 X |
| 3,384,713 | 5/1968 | Duncan | 340/147 X |
| 3,428,948 | 2/1969 | Simjian | 340/147 |

*Primary Examiner*—Donald J. Yusko
*Attorneys*—William D. Soltow, Jr., Albert W. Scribner, Martin D. Wittstein and Donald F. Daley ABSTRACT: Apparatus for setting from a remote location the descending monetary register of a postage meter to increase the amount of register credit against which the meter will continue to issue postage. Upon request, telephone communication is established between a central agency and the remote meter, whereupon a coded signal is dispatched to the meter which automatically compares the incoming signal with correspondingly coded information stored in the meter. Upon completion of receipt of a proper signal a driving mechanism is actuated to drive the monetary register in an ascending direction by a predetermined amount, whereas an improper signal disables the driving mechanism to prevent further operation until the meter is opened, inspected and manually set.

PATENTED JUL 27 1971

INVENTOR.
Alton B. Eckert
BY
Martin P. Wittstein
ATTORNEY

AUTOMATIC REGISTER SETTING APPARATUS

BACKGROUND OF THE INVENTION

This invention relates generally to registers for use with security accounting control devices. More particular, it relates to apparatus by which registers of security control meters are automatically set in response to an appropriate signal received from a location remote from the meters.

The principles of the present invention find utility in a wide variety of applications in which value indicating settable registers are utilized, and particularly in those applications where a high degree of security in register accounting is required. For the purpose of illustrating a practical and presently preferred mode of carrying out the invention, it is hereinafter described and shown in combination with a postage metering and imprinting device. It will be understood, however, that the principles of the present invention are applicable to any metering device having a settable register and means for changing the reading of the register in one direction in response to normal operation to the metering device, wherein it is periodically desired to automatically set the register from a remote location to change the reading of the register by a predetermined amount and in a direction opposite to the direction in which the register is changed in response to normal operation of the metering device.

A typical postage meter, such as those manufactured by Pitney-Bowes, Inc., of Stamford, Conn., comprises a printing mechanism which prints a postage stamp facsimile on an envelope or paper tape which can be applied to bulk mail. A plurality of settable printing wheels are adjusted by suitable controls to print the desired amount of postage each time the meter is operated, which operation may be either manually or automatically controlled.

Postage accounting is effected in the meter by means of ascending and descending registers which are actuated each time the meter is operated to imprint a postage mark. With each such operation, the ascending register is increased by the amount of postage printed, so that at any given time, this register shows the cumulative monetary amount of postage printed from the time the metering device is first put into service. Simultaneously, with each such operation, the descending register is decreased by an equal amount, so that this register shows at any given time the monetary amount of postage credit remaining available to the customer.

In the accounting and control system presently utilized with the above device, when a customer observes the necessity for replenishing the amount of postage credit in his meter, he customarily mails a check to the Post Office for the amount of additional postage credit which he desires and, after allowing time for the check to clear, he takes his meter to the Post Office where a proper authority breaks a seal, opens the meter, and manually sets the descending register to add thereinto an amount equal to the desired postage credit for which payment has been made by the customer. The authority then closes the meter, reseals it and returns it to the waiting customer. Of course, appropriate record of transaction is maintained at the Post Office.

The customer is now free to operate his postage meter until his available postage credit is again used up. As a practical matter, the meter locks up and further operation thereof is prevented when the descending register reaches a value indication which is equal to or less than the maximum monetary amount of postage which the metering device can print on any given operation.

Postage metering devices of the type described above have enjoyed great commercial success in spite of the necessity for the customer to take his meter to the Post Office when additional postage credit is desired. This necessity, however, causes inconvenience to a customer as well as to the Post Office agents, and the requirement that register wheels be manually set renders each setting transaction susceptible to human error and the possibility that either the customer or the Post Office may be deprived of proper credit or money as the case may be.

BRIEF SUMMARY OF THE INVENTION

The present invention overcomes the disadvantages of present postage metering and printing techniques, and also achieves advantages not heretofore contemplated, by providing apparatus for automatically setting the descending register of the postage meter in situ from a remote location by the transmission from the remote location of a properly coded signal. Thus one centrally located authorizing agency, such as the main Post Office or a branch office can, by use of a conventional communication link such as the telephone lines, automatically set a customer's meter at his location in response to a request by the customer for additional postage credit, conditioned upon the customer having paid the required amount of money.

In general principle, the invention is directed toward an apparatus for automatically setting the monetary register of a metering device to change the reading thereof by a predetermined amount and in a direction opposite to that in which the monetary register is driven in response to normal operation of the metering device, the setting operation occurring upon receipt of a coded signal which matches correspondingly coded information stored in the metering device against which the coded signal is compared. The invention further contemplates preventing the meter register from being automatically set upon receipt of subsequent properly coded signals if a preceding improperly coded signal is received by the metering device, until the apparatus has been inspected and manually reenabled for operation by a supervising authority.

In one of its broader aspects, the invention comprises the combination of a metering device having a settable value indicating register and means responsive to operation of the metering device for driving the register in one direction indicative of a metering operation. Means are provided for receiving from a remote location a coded signal having a variable sensible characteristic which varies according to a selected code pattern, and there is means in the metering device for storing coded information having a variable sensible characteristic which varies according to a predetermined code pattern. There is also provided means for detecting variations in the sensible characteristics of both the signal and the stored information, and for comparing the selected code pattern of the signal with the predetermined code pattern of the stored information. If there is identity of the code patterns, then means responsive to detection of the code pattern identity operates to drive the register in a direction opposite to the above mentioned one direction and by a predetermined value, thereby setting the register from the remote location in response to transmission therefrom of a properly coded signal. In the event of detection of a lack of identity between the code patterns, suitable means operates to prevent the register from being automatically set immediately upon detection of lack of code pattern identity.

The coded information stored in the device includes a plurality of separate and distinct items of information so that the register can be automatically set for the predetermined amount of postage credit a desired number of times without the metering device having to be manually set or otherwise serviced. However, in order to prevent automatic setting of the register by signals from an unauthorized source, the predetermined code pattern of the sensible characteristic of the stored information changes according to a predetermined random pattern with each item of information. Since only a duly authorized agency has knowledge of the correct sequence of code patterns of the information stored, only this agency can transmit a signal having a properly selected code pattern. Thus the present invention provides a high degree of security in the postage accounting system for which it is presently intended.

Having briefly described the nature of one embodiment of the invention, it is a principal object thereof to provide apparatus for automatically setting the settable register of a metering device in response to the receipt from a remote location of a properly coded signal.

Another object of the present invention is to provide an automatic register setting apparatus which is responsive to a signal which can be transmitted to the apparatus from the remote location over conventional transmitting media.

Another object of the present invention is to provide an automatic register setting apparatus in which the setting of the register is effected in predetermined amounts and in opposition to the nature of register change effected by normal operation of the metering device.

A further object of the present invention is to provide an automatic register setting apparatus which is operable to set the register any predetermined consecutive number of times without manual intervention in the operating components of the apparatus as long as properly coded signals are received.

Another object of the present invention is to provide an automatic register setting apparatus which requires a different coded signal for each successive register setting operation of the apparatus, the code patterns of successive signals differing according to a predetermined random pattern.

Still another object of the present invention is to provide an automatic register setting apparatus which operates in response to receipt of an improperly coded signal to thereafter prevent the register from being set automatically.

Still another object of the present invention is to provide an automatic register setting apparatus in which the mechanical and electronic elements of the register setting apparatus are entirely arranged as an integral assembly with the utility device of which the settable register is a part.

Another object of the present invention is to provide apparatus of the character described which is relatively simple and inexpensive, reliable in operation and substantially free of maintenance.

Further objects and advantages of the present invention will be more readily apparent from an understanding of the following detailed description of the invention when considered in conjunction with the accompanying drawings, in which FIG. 1 is a perspective view of one form of a postage metering device embodying the principles of the present invention;

DETAILED DESCRIPTION OF THE INVENTION

Figure 1:
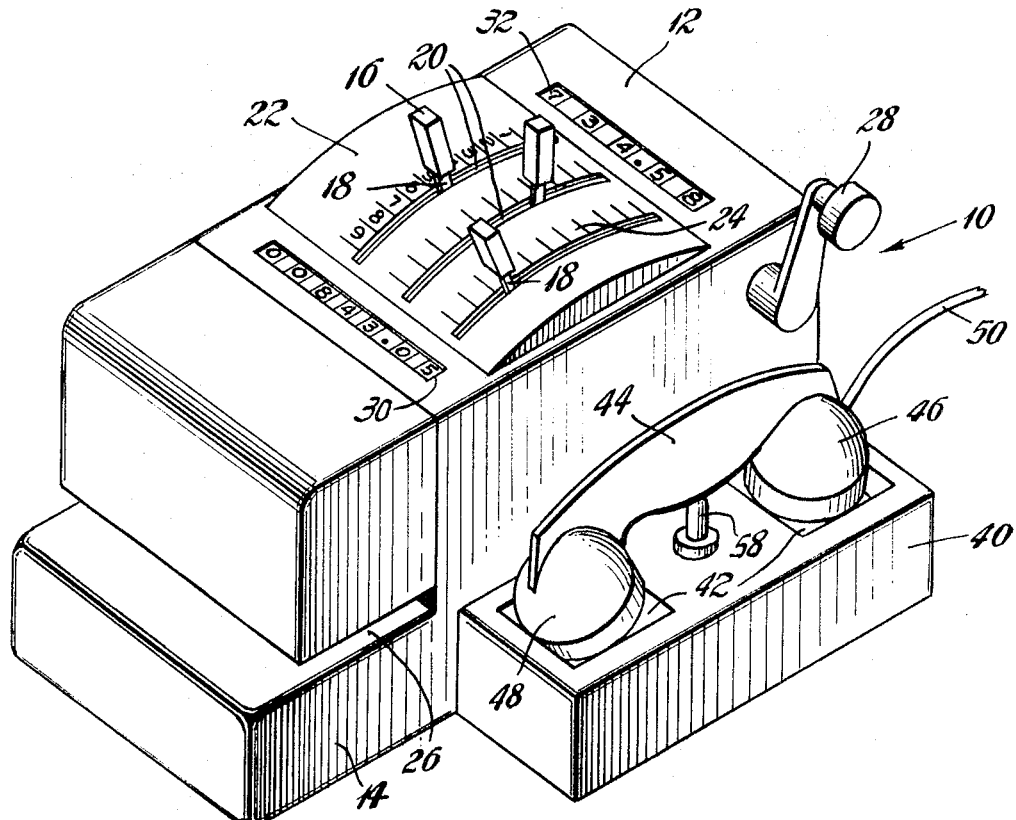

Referring now to the drawings, FIG. 1 shows generally the major components required by the customer for carrying out the principles of the present invention as applied to postage metering and imprinting. The metering device 10 comprises a postage meter 12 and an imprinting base 14 which, for convenience of illustration and description, are combined into a single operating mechanism, although they may be separable if desired. The meter 12 includes a plurality of finger knobs 16 mounted on levers 18 which slide in slots 20 formed in the meter cover 22, the levers 18 being operatively connected in any suitable or well-known manner to a corresponding plurality of settable printing wheels (not shown) located in the meter 12. Suitable indicia 24 indicates when the levers 18 are set to cause the metering device 10 to print the desired amount of postage.

Imprinting is accomplished by inserting an envelope into the slot 26 in a prescribed manner and then operating the crank 28, the latter being operatively connected to a suitable striking platen (not shown) which forcibly engages the envelope with the printing wheels and with a nonsettable printing die in order to print the entire postage stamp facsimile. The structure and mode of operation of the printing function of the postage meter are well known to those skilled in the art and need not be further described herein.

The meter 12 is provided with two registers 30 and 32, the register 30 being an ascending register and serving to keep a running total of the entire monetary value of postage credit which the machine has printed. By suitable driving connections with crank 28, the amount of postage credit printed is added into the ascending register 30 each time the metering device 10 is operated. This register is not normally intended to be reset once the meter is placed in service.

The details of construction of the driving connections between the actuating crank 28 and the ascending and descending registers 30 and 32 is not significant to the present invention except to the extent specifically disclosed hereinafter. Any suitable driving connections may be utilized such as those disclosed in U.S. Pat. Nos. 2,552,182, 2,657,593 and 2,774,537.

The register 32 is a descending register and serves to indicate the balance of postage credit remaining available to the customer at any given time. By suitable driving connections with the crank 28, in the manner of the above noted patents, the amount of postage printed is substracted from the register 32 each time the metering device 10 is operated. The descending register 32 is periodically manually set in accordance with the customer's wishes in that when he desires additional postage credit to be made available, he takes his meter to the Post Office where the agent breaks a seal, opens the meter and manually turns the appropriate descending register wheels to add into the register an amount of postage credit for which the customer has previously paid. The agent closes and reseals the meter and returns it to the customer who may now use the postage credit available.

As a practical matter, means well known in the postage meter art are provided for causing the meter to "lock-up" when the amount in the descending register is equal to or less than the maximum amount of postage credit which the metering device can print. For example, in the three lever metering device 10 shown in FIG. 1, the maximum amount of postage that can be printed for any given operation is $9.99. Therefore as long as there is $10.00 or more of credit remaining in the register 32, the meter 12 will operate, but it will "lock-up" after the next operation regardless of the amount of postage credit printed on that operation. Thus the metering device can never be operated to print postage in excess of the credit balance remaining therein.

The present invention is directed toward the provision of apparatus in combination with the above described structure, by which the register 32 can be set to provide additional postage credit at the customer's location of use, thereby obviating the necessity of taking the meter to the Post Office for setting. The mechanical and electrical components hereinafter specifically described operate to set the register 32 by changing the value indication of the descending register to add postage credit thereto in the same manner as described above by the Post Office agent, except that the setting is accomplished automatically from a remote location in response to a properly coded signal via a communication hook-up with the remote location.

The general construction and organization of the major components of the meter setting apparatus will now be described with reference to FIGS. 1 and 2. A suitable housing 40 is adapted to contain the communication circuitry for the apparatus and the control elements for determining the transmission of a properly coded signal for operating the register setting mechanism. More specifically, the housing 40 is conveniently designed to provide a holding cradle 42 for a conventional telephone handset 44, the latter having the usual transmitter 46, receiver 48 and communication line 50. Mounted in the housing 40 in intimate association with the telephone transmitter 46 is the buzzer 52 or other suitable signal generator, the buzzer 52 being connected to a suitable source of current via the lead 53 and ground 54 by a switch 56 adapted to be closed by an actuator 58 which is contacted by the telephone handset 44 when the latter is properly positioned in the cradle. The buzzer 52 then transmits a signal to the telephone transmitter 46 and is transmitted via line 50 to the Post Office or other remote location of the agency controlling the meter setting operation. This signal assures the agency that the customer has properly positioned the telephone handset 44 for transmission of the coded signal.

Means are provided for receiving from the telephone handset 44 a signal having a sensible characteristic such as frequency, waveform, etc., and for comparing the signal with coded information stored in the meter. Thus, in one embodiment there is mounted in the housing 40 in intimate association with the receiver 48 a suitable audio or electromagnetic transducer 60 such as a microphone or an inductive pickup which is capable of receiving an audio or electromagnetic signal or a given frequency from the receiver 48 and converting it into an electric impulse signal having a corresponding frequency. The signal is amplified by the squaring amplifier 62 and then conducted via lines 64 and 66 to a pair of frequency filters 68 and 70 connected in parallel and which are each tuned to pass only a signal having a specified frequency, each filter being tuned for a different frequency.

The output of the filters 68 and 70 diverges, each output being conducted via lines 72 and 74 to an "or" gate 76, and via lines 78 and 80 to the contacts 82 and 84 respectively of a signal comparator 85 which is actuated by a sensing element 87 connected to the signal comparator by a mechanical linkage 86, being any suitable information reading device conventionally employed with data storage and processing equipment. The sensing element 87 is conveniently mounted in the housing 40 in position to progressively scan information from a data storage means preferably in the form of a punched paper tape 88 which can be stored on reels and intermittently advanced past the sensing element 87 by a pinwheel 90 engaging with suitable holes 92 in the tape 88. The information stored on the tape has a variable sensible characteristic and is preferably a series of holes 94 and solid portions 96 between selected holes 94, the holes 94 and solid portions 96 being distinguishable by the element 87 and constituting what shall hereinafter be termed a mark information bit and a space information bit respectively. The comparator 85 includes a contact arm 98 which is movable between the contacts 82 and 84 in response to detection by the element 87 of a mark and a space respectively so that the sensible characteristic of each information bit is transferred to the contacts 82 and 84. The contact arm 98 is operatively connected to suitable circuit control means which functions to disable further operation of the meter setting apparatus upon receipt of an improper signal, as will now be more fully explained.

The contact arm 98 is electrically connected by a line 100 to a resistor 101 and then by a line 100' to a suitable switching means such as the gate electrode of a silicon controlled rectifier 102, although it will be obvious to those skilled in the art that mechanical switching means could be utilized. The anode and cathode of the silicon controlled rectifier 102 are in a circuit comprising a line 103, a suitable circuit controller or breaker such as the fuse 104, a power supply source 105 and ground 106. A resistor 107 is connected to the line 100' at a junction 108 between the resistor 101 and the gate electrode of the silicon control rectifier 102, the resistor 107 being connected to a negative direct current terminal −V of the power source 105 to receive a negative voltage therefrom. The power source 105, which is adapted to be connected to a conventional electric current source via the line 109 and plug 110, provides power through a line 111 to a solenoid driver amplifier 112, which in turn provides current through line 115 of sufficient amplitude to energize solenoid 114, the function of which will be described in more detail below in connection with the drive mechanism for the tape 88 illustrated in FIG. 3.

In the circuit thus far described, the line 78 and 80 from the output of the filters contacts 82 and 84, contact arm 98, line 100, resistor 101, line 100', gate electrode and anode of silicon controlled rectifier 102, line 103, fuse 104, power source 105 and ground 106 all constitute an error circuit the function of which is to disable further operation of the apparatus upon receipt of an improper setting signal by blowing the fuse 104 in a manner more fully described below in connection with the description of operation of the apparatus.

It should be noted at this point that the power source 105 supplies power to all of the necessary components of the apparatus, including the squaring amplifier 62 and the "OR" gate 76 as well as the solenoid driver amplifier 112, all in a manner well known to those skilled in the art.

It should also be noted that the spaces 94 and solid portions 96 are numbered from 1 to 10 (this being for convenience of understanding only) in two series A and B, and that the arrangement of information bits in each series is different. Thus a tape 88 may be provided with as many series of information bits as desired, each series comprising 10 bits, or such other number as may be desired, with the consecutive order of marks and spaces changing with each series. Accordingly, the variable sensible characteristic of each series of information bits has a predetermined code pattern which is sensed successively by the element 87 as the tape 88 is advanced therepast, and this predetermined code pattern of the information bits is transferred to the contacts 82 and 84 respectively by the contact arm 98 responding to detection of spaces or marks on the tape.

Referring back now to the "OR" gate 76, the output therefrom is shown schematically as being conducted by a line 113 to the solenoid driver amplifier 112 and thence by a line 115 to the solenoid 114. The solenoid 114 is operatively connected, as indicated by the numeral 116 to the pinwheel 90 in such a manner that each time the solenoid 114 is momentarily energized and deenergized by a signal from the "OR" gate 76 through the amplifier 112, the pinwheel 90 is rotated an amount sufficient to advance the tape 88 an increment of linear movement corresponding to the distance between consecutive adjacent information bits 94 or 96 on the tape. As indicated by the numeral 118, the pinwheel 90 is operatively connected to an incremental motion accumulating means such as a Geneva drive 120 which in turn is operatively connected as indicated by the numeral 122 into the highest order number wheel of the descending register 32. The details of the driving connections 116 and 118, as well as the Geneva drive 120 and the connection 122 into the register 32 are more fully explained in connection with FIGS. 3 and 4, it being sufficient at this point to understand only that the Geneva drive 120 accumulates the intermittent motion of the pinwheel 90 and the tape 88 and produces an output motion at 122 only after the tape has advanced 10 increments of movement, i.e., the distance corresponding to one complete series of information bits. The output motion at 122 from the Geneva drive 120 rotates the highest order counter wheel one digit in a direction opposite to the direction in which the counter wheel is rotated in response to operation of the metering device 10 by the crank 28.

In the illustrated embodiment, since the register is driven in a descending direction in response to manual operation of the meter, the counter wheel of the register is rotated in an ascending direction by the meter setting apparatus.

It should be noted that the Geneva drive 120 transmits a register setting motion to the register only at the completion of movement of the tape 88 for one complete series of information bits regardless of the number of bits contained in each of the series on the tape. Therefore a register setting operation cannot be effected unless the tape 88 is advanced the final increment, which, in the illustrated embodiment, is the tenth increment.

Figure 2:
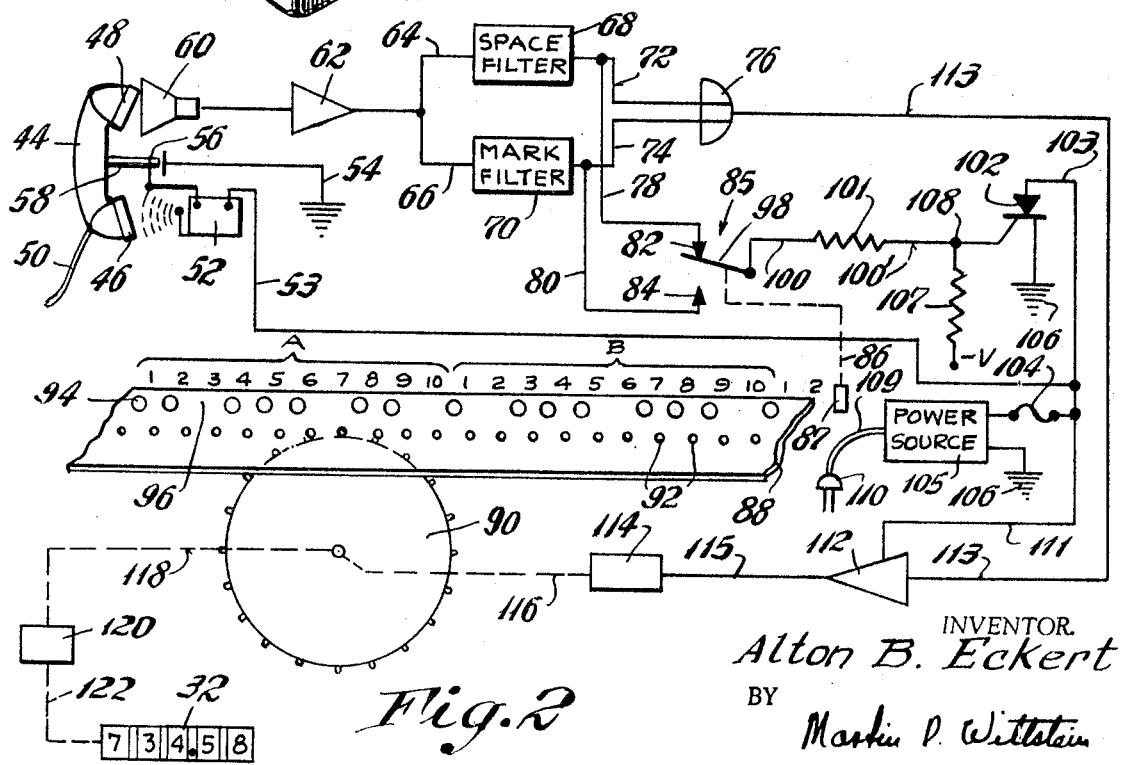
FIG. 2 is a schematic diagram of the major components of the meter setting apparatus including a wiring diagram of only so much of the electric circuitry as is necessary for an understanding of the invention.

Also, where, as shown in FIGS. 1 and 2, the highest order counter wheel in register 32 represents the $100 order, the value indicated by the register will be increased $100 with each setting operation. It will be recognized that the selection of this counter wheel is arbitrary, and that any of the counter wheels of the register can be similarly connected to the Geneva drive 120 to be driven, and it may be driven any desired number of digits by suitable gearing within the Geneva drive 120.

From the foregoing description and with reference to FIGS. 1 and 2, an understanding of the mode of operation of the apparatus as thus far described can be obtained. A customer, having once had his postage meter installed with the credit balance in the descending register 32 equivalent to the amount of money he has paid, uses the meter in the manner described above. When the observes from a reading of the descending register that he needs additional postage credit, he forwards payment to the Post Office for the predetermined amount of credit for which his meter can be automatically set, or an even multiple thereof if he desires more than the predetermined amount. After his payment is credited at the Post Office, the customer calls the appropriate agent at the Post Office, or any central location having supervisory authority over meter setting, and requests that his meter be set. The agent requests certain information for the purpose of identifying the proper code to transmit and for other record keeping purposes, and then requests the customer to place his telephone handset 44 in the cradle 42 in the prescribed manner. This having been accomplished, the handset 44 depresses the actuator 58 to close the switch 56, thereby causing the buzzer 52 to transmit a signal to the telephone transmitter 46 and thence to the agent to indicate that the customer's meter and telephone handset have been properly arranged for the setting operation.

The agent, by suitable manual or automatic means, causes a signal to be transmitted over the telephone line 50 which is picked up by the microphone 60 and transmitted via the amplifier 62 to the filters 68 and 70. The signal is transmitted from the central station preferably in the form of a series of bursts or signal bits corresponding in number to the number of information bits on the tape 88 constituting a series, although other signal forms may be utilized so long as there is a variable sensible characteristic which varies according to a selected code pattern and the variations of the sensible characteristic can be detected and distinguished. The signal bits are transmitted at a frequency corresponding to one or the other of the frequencies to which the filters 68 and 70 are tuned, and they must be transmitted according to a selected frequency order or succession which matches the predetermined code pattern of the sensible characteristic of the information bits on the tape 88. Accordingly the incoming signal has a variable sensible characteristic which varies according to a selected code pattern, and this code pattern is successively compared with the predetermined code pattern of the sensible characteristic of the information on the tape. If the signal bits are transmitted in the proper code pattern, the signal bits passed by the filters 68 and 70 will pass through the "OR" gate and line 113, amplifier 112 and line 115 to drive the tape and ultimately set the register 32; if an improper signal bit is received, the above described error circuit is energized to disable the apparatus.

More specifically, and referring to FIG. 2, assuming that the sensing element 87 is scanning the information bits of series A, and, when reading bit 01 which is a hole, the contact arm 98 of the comparator 85 is caused to take the position where it engages contact 82 connected to filter 68, the first incoming signal bit should have a frequency corresponding to that of the filter 70 so that it passes through that filter and finds an open circuit at the contact 84. Accordingly, the filter 70 may be termed the MARK filter and the filter 68 may be termed the SPACE filter.

Assuming the first signal bit to be of the proper frequency, it is conducted via line 74 through the "OR" gate 76, thence via the line 113 to the solenoid driver amplifier 112 which functions in a manner well known to those skilled in the art to cause a momentary surge of current to pass from the power source 105 through the fuse 104, line 111 and line 115 to the solenoid 114 which is then momentarily energized. Energization of the solenoid 114 cocks a spring driven ratchet driving mechanism shown in detail in FIG. 3 and particularly described hereinafter, and indicated in FIG. 2 by the numeral 116. When the signal terminates, the solenoid 114 is deenergized and the driving mechanism 116 rotates the pinwheel 90 sufficiently to advance the tape one increment of movement so as to bring information bit 02, also a mark, under the sensing element 87 to be read. Since information bit 02 is also a mark, the position of contact arm 98 does not change.

Simultaneously with the advancing movement of the tape 88 by the pinwheel 90, an increment of movement is put into the Geneva drive 120 through connection 118 where this increment of movement is accumulated as more fully explained below. The apparatus is now conditioned to receive the second signal bit.

If the second signal bit has the same frequency as the first, the above described steps are repeated since information bit 02 is also a mark. On the other hand, if the second signal bit has a frequency corresponding to that of the space filter 68, the signal will be conducted through the error circuit consisting of the line 78, the contact 82, the contact arm 98, the line 100, the resistor 101, the line 100', to the gate electrode and anode of the silicon controlled rectifier 102. The resistors 101 and 107 constitute a voltage divider which, in conjunction with the voltage −v impressed upon the resistor 107 from the power source 105, determines the firing point of the silicon control rectifier 102. The voltage −v is arranged such that a signal in the line 100 will cause a signal at the juncture 108 of the resistors 101 and 107 to rise above the level of the firing point of the silicon controlled rectifier 102 causing it to become conductive. The power source 105 is now effectively short-circuited through the fuse 104, line 103 and the conductive path of the silicon controlled rectifier 102 to ground 106 with the result that the high current through the short circuit causes the fuse to blow thereby depriving the solenoid driver amplifier 112 of its power source. Since the signals conducted through the "OR" gate 76 and line 113 are of insufficient strength to energize the solenoid 114 to the point of operation, further operation of the entire apparatus is effectively prevented and a meter setting operation cannot take place. The customer now must take his meter to the Post Office to have the fuse replaced, and, as a practical matter, the cause for the error circuit operation is investigated and determined.

Assuming that the transmission of the second signal bit was proper and the tape 88 was advanced another increment of movement as described above, the sensing element 87 now reads information bit 03 which is a space, and this reading causes the element 87 to move the contact arm 98 to its alternate position where it engages the contact 84. The comparator 85 is now conditioned to receive the third signal bit which, for continued operation, must have a frequency corresponding to that of the space filter 68, so that an open circuit is maintained at the contact 82 in the error circuit in order for an operating signal to be transmitted to the solenoid 114.

The above described procedure continues throughout the entire series of information bits until the 10th information bit is read. When the 10th signal bit is received and compared, the tape is advanced the last increment of movement to bring the first information bit of the next series B under the sensing element 87. This last increment of movement is transferred through the connection 118 to the Geneva drive 120 which now operates to transfer a movement through the connection 122 to rotate the highest order register wheel one digit in an ascending direction, thereby adding $100 of postage credit to the register 32.

The customer now picks up his telephone handset 44 and reports the new register reading to the postal agent to verify the accuracy of the register setting operation, and the transaction is completed. In the event that the customer desires more than $100 of postage credit, for example $300, the entire procedure described above is repeated for three consecutive series of signal and information bits. Of course, it is necessary that any additional postage credit which is purchased be in even multiples of the predetermined amount for which the register setting apparatus has been designed.

It will now be apparent that in the foregoing apparatus a register setting operation is dependent upon the receipt of an entire series of signal bits which, upon comparison, properly match in selected code pattern the predetermined code pattern provided on the tape, and that detection of any unmatched signal bit will automatically disable the apparatus for further operation.

Figure 3:
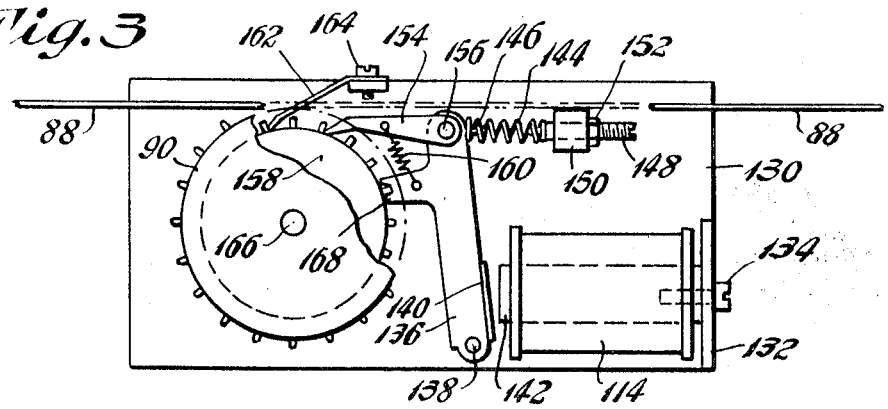
FIG. 3 is a side elevational view of a mechanism for advancing the coded tape.

Referring now to FIG. 3, there is shown a structure suitable for advancing the tape 88 in incremental movements in response to successive energizations of the solenoid 114 by receipt of a properly coded signal. The solenoid 114 is mounted on a bracket which is generally an upstanding plate 130 suitably mounted in the housing 40, the plate having a bent tab 132 to which the solenoid 114 is secured as by the screw 134. An upstanding lever 136 is pivotably mounted at 138 to the plate 130 and has a flat armature portion 140 which is attracted toward the core 142 when the solenoid 114 is energized. The lever 136 is normally biased away from the solenoid by a spring 144 captured between a retaining prong 146 on the upper end of the lever 136 and an adjusting screw 148 threadedly engaged with a bracket 150 secured to the plate 130. A locknut 152 holds the screw 148 in a selected position.

A driving pawl 154 is pivotably secured as at 156 to the upper end of the lever 136, the free end of the pawl 154 engaging the teeth of a ratchet 158 and being maintained in such engagement by a spring 160 connected between the lever 136 and the pawl 154. A nonreturn pawl 162 in the form of a leaf spring is secured to the plate 130 as at 164, the free end of the nonreturn pawl also engaging the teeth of the ratchet 158. The ratchet 158 is fixed to a shaft 166 rotatably supported by the plate 130, the shaft also carrying the pin wheel 90 for rotation therewith. The lever 136 also has a locking projection 168 thereon adapted to engage a tooth on the ratchet 158 when the latter is not being driven. In operation, when the solenoid 114 is energized at commencement of receipt of a signal from the "OR" gate 76 in the manner above described, the lever 136 is urged toward the right as viewed in FIG. 3, during which time the spring 144 is compressed and the driving pawl 154 is retracted from the position shown and brought into engagement with the next tooth in the clockwise direction of the ratchet 158. When the signal ends, the solenoid 114 is deenergized and the spring 144 drives the lever 136 toward the left, whereupon the driving pawl 154 pushes the ratchet wheel 158 one tooth space in the counterclockwise direction. This rotates the shaft 166 which in turn rotates the pinwheel 90 to advance the tape 88 the increment of movement necessary to bring the next information bit 94 or 96 into reading relationship with the sensing element 87.

Figure 4:
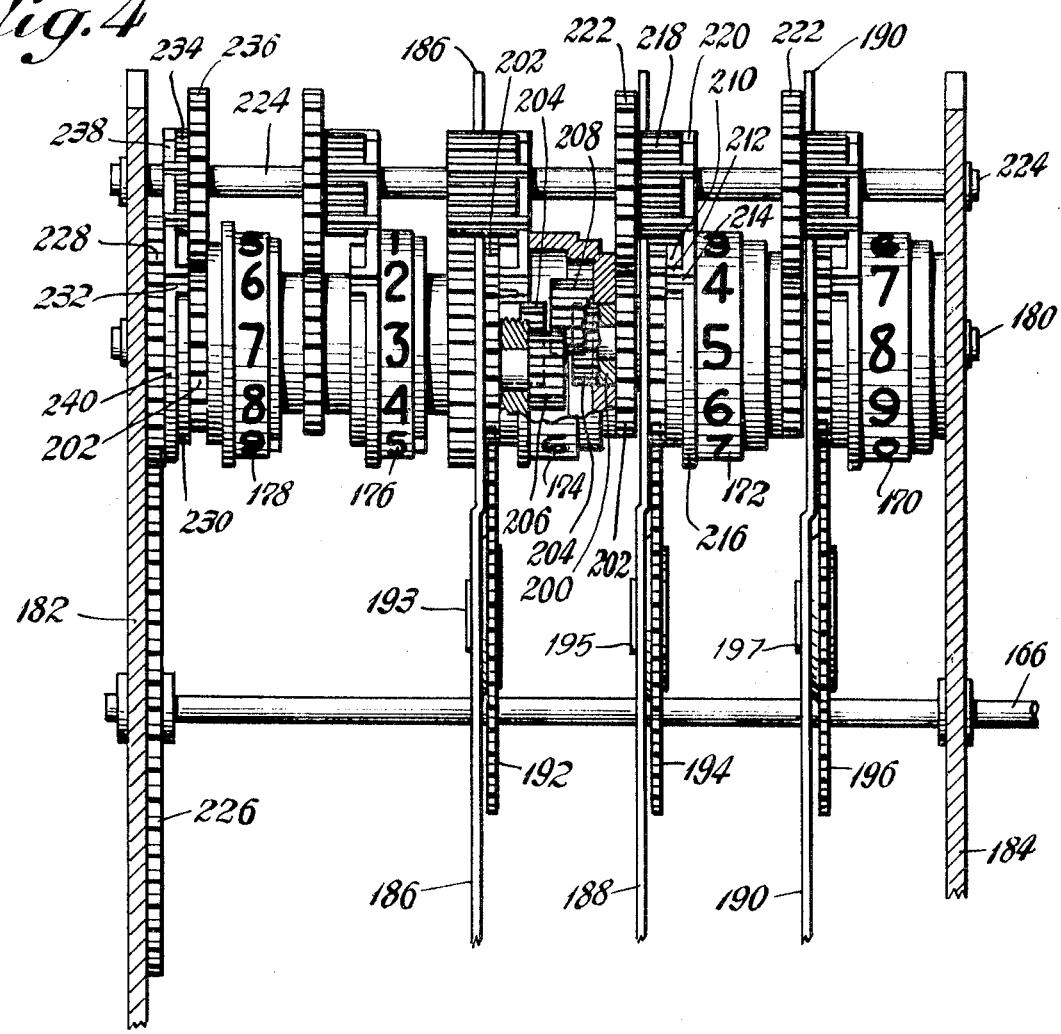
FIG. 4 is a plan view, with parts broken away for clarity, of one form of descending register and of the mechanism by which the register is set.

Referring now to FIG. 4, there is shown the mechanism by which the rotation of the shaft 166 in the tape drive mechanism is accumulated and transferred to the descending register 32 to add thereinto the predetermined amount of postage credit for which the apparatus is designed in response to movement of the tape 88 a distance corresponding to a reading of a complete series of information bits.

The register 32 comprises a plurality of numeral wheels 170, 172, 174, 176 and 178 (representing respectively the cents, 10 cents, dollars, 10 dollars and hundred dollars orders) rotatably supported on a shaft 180 which is supported by a pair of spaced parallel plates 182 and 184 located in the meter 12. A plurality of intermediate plates or supporting members 186, 188 and 190 are provided for supporting part of the mechanism for actuating the register wheels in a descending counting direction in response to normal operation of the metering device 10 in printing a postage facsimile mark. Part of the register wheel actuating mechanism is shown as the gears 192, 194 and 196 rotatably mounted as by stub shafts 193, 195 and 197 on the plates 186, 188 and 190 respectively, these gears being driven in an appropriate direction to drive the numeral wheels 174, 172 and 170 respectively in descending direction when the crank 28 is actuated. The driving of the gears 192, 194 and 196 by actuation of the crank 28 is accomplished by any suitable driving means such as disclosed in the above mentioned Pats. Nos. 2,552,182, 2,657,593 and 2,774,537 and therefore need not be further described herein.

Each of the register numeral wheels 170, 172, 174 and 178 is part of a differential subassembly of the type substantially as illustrated in FIGS. 7 and 8 of Pat. No. 2,774,537. Referring to the numeral wheel 174 for a brief description of the subassembly, the numeral wheel itself is a hollow shell with numbers on its peripheral surface, the shell being rotatably carried on each side by a hub 200. Each hub is itself rotatably carried by the shaft 180 and is integral with a pair of gears, a driving gear 202 being external of the shell and a sun gear 204 being internal of the shell; it should be noted that each differential subassembly has a driving gear 202 and a sun gear 204 connected by the hub 200 on each side of the numeral wheel 170 for a reason to be made clear hereinafter.

The subassembly further comprises a pair of planetary pinions 206 and 208, the axles of which are rotatably carried by the shell 174, the pinions 206 and 208, the axles of which are rotatably carried by the shell 174, the pinion 206 meshing with one of the sun gears 204 and with the other pinion 208, this pinion also meshing with the other sun gear 204. It will now be apparent that if either of the driving gears 202 is held against rotation and the other driving gear is rotated, rotary movement will be imparted to the numeral wheel 174 through the differential subassembly at a determinate rate, the ratio of movement between the driving gear 202 and the numeral wheel 174 being 2:1 because of the differential action. The principle of this differential subassembly is well known in the art and further explanation thereof is not deemed necessary.

Each of the numeral wheels 170, 172, 174 and 176 is provided with a stepped rim or disc 210 (see numeral wheel 172) having two transfer gear teeth 212 projecting from the periphery thereof, the teeth providing a space 214 therebetween which extends through an edge portion 216 of the numeral wheel. The transfer teeth 212 and the edge portion 216 form part of a tens transfer unit connecting each of the numeral wheels 170, 172, 174 and 176 with the numeral wheel of the next higher order. Each transfer unit also comprises a transfer pinion 218 having a full complement of teeth, a Geneva lock element 220 having only five teeth and a coupler gear 222 also having a full complement of teeth. These elements are preferably formed as a single unit and are indicated in connection with the numeral wheels 172 and 174. All of the tens transfer units are rotatably carried by a shaft 224 mounted in the plates 182 and 184.

From the structure thus far described, it will be apparent that each time the 10 cents numeral wheel 172 is rotated one complete revolution, its transfer teeth 212 will mesh with the pinion 218 and rotate it one increment of movement. This movement is transferred through the coupler gear 222 to the right side driving gear 202 on the 1 dollar numeral wheel 174 so as to rotate this wheel one number unit. Thus each time a numeral wheel of lower order moves from "0" to "9" (remembering that this is a descending register), the numeral wheel of next higher order is advanced one number in the descending direction of rotation. In between transfer operations, the coupler gear 222 and the right side driving gear 202 of each numeral wheel are locked against rotation by the teeth of the Geneva lock element 220 engaging the peripheral surface of the edge portion 216 of the numeral wheel, this lock being released during tens transfer by the appropriate tooth and the Geneva lock element 220 passing into the space 214 on the rim 216 of the numeral wheel. Also, in between or during transfer operations, the numeral wheels 170, 172 and 174 may also be rotated by the left side driving gears 202 which are meshing with the gears 196, 194 and 192 respectively, the latter being rotated when the metering machine is operated by movement of the crank 28.

It should be noted that the numeral wheel 170 has no right side driving gear 202 for the reason that it is the wheel of lowest order and therefor cannot receive a tens transfer.

It should be noted that the numeral wheel 176 is not part of a differential subassembly for the reason that this wheel is merely a cumulator or overflow wheel, the sole function of which is to receive tens transfers from the wheel 174, and to transfer tens to the wheel 178.

Coming now to the specific register structure by which the predetermined amount of postage credit is added into the register by operation of the tape advancing mechanism of FIG. 3, it is seen that the shaft 166 is suitably connected between the tape drive mechanism and the register 32, and is shown as being rotatably supported by the meter plates 182 and 184. A gear 226 mounted on the shaft 166 meshes with a gear 228 rotatably carried by the register wheel shaft 180, the drive ratio between the gears being selected so that each time the shaft 166 and gear 226 have completed a number of rotary movements (in the illustrated embodiment, 10) equivalent to the number of information bits in a series, the gear 228 will make one revolution.

The gear 228 corresponds to one of the above described numeral wheels in function in that it is a counter wheel having a tens transfer capability. Thus the gear 228 has a stepped disk 230 having a pair of transfer teeth 323 thereon which are adapted to mesh with a transfer pinion 234 each time the disk 230 completes a revolution. The transfer pinion 234 is integrally formed with a coupler gear 236 which meshes with the left side driving gear 202 of the differential subassembly of which the hundreds order numeral wheel 178 is a part. The transfer pinion 234 also has a Geneva lock element 238 which makes sliding contact with an edge portion 240 of the gear 228 so as to prevent any rotation of the transfer pinion between transfer operations.

It will now be seen that the rotary movement of the shaft 166 caused by the tape advancing mechanism illustrated in FIG. 3 is transferred to the gear 228 via the gear 226 with the result that each time the tape 88 advances a distance corresponding to a complete series of signal bits, the gear 228 makes one revolution, A revolution of the gear 228 is transferred through the transfer teeth 232, the pinion 234, the coupler gear 236 and the left side driving gear 202 of the differential subassembly of the numeral wheel 178, whereupon the numeral wheel is moved one number unit. Of course, it should be noted that the drive chain from the shaft 166 to the numeral wheel 178 is such that the latter is rotated in a direction opposite to the direction in which it is rotated in response to a transfer movement from the numeral wheel 176 during normal metering operation of the metering device 10. Thus, the revolution of the gear 228 is operative to move the numeral wheel 178 one number unit in the direction opposite to the direction in which it is driven by normal meter operation. In the specific embodiment illustrated, the register mechanism illustrated in FIG. 4, as indicated above, is the descending register 32 of the meter 12 which contains an initial amount of postage credit and from which the incremental amounts of postage dispensed with each meter operation are subtracted. Accordingly, the gearing of the drive mechanism is arranged to turn the numeral wheel 178 in an ascending direction with the result that an additional $100 worth of postage credit is added to the register 32 each time the numeral wheel 178 is advanced one unit by a complete revolution of the gear 228.

It is apparent from the foregoing that there has been provided an automatic register setting apparatus which achieves the foregoing objects and advantages of the present invention. It is to be understood, however, that the invention is not to be considered as limited to the specific embodiment described above and shown in the accompanying drawings, which embodiment is merely illustrative of the best mode presently preferred for carrying out the invention and is susceptable to change in form, size, detail and arrangement of parts, but rather the invention is intended to cover all such variations, modifications and equivalents thereof as may be deemed to be within the scope of the claims appended hereto.

I claim:

1. In combination:
   A. A metering device having a settable value indicating register and means responsive to operation of said metering device for driving said register in one direction indicative of a metering operation,
   B. means for receiving from a remote location a coded signal having a variable sensible characteristic which varies according to a selected code pattern,
   C. means in said metering device for storing coded information having a variable sensible characteristic which varies according to a predetermined code pattern,
   D. means for detecting variations in the sensible characteristics of said signal and said stored information and for comparing the selected sensible characteristic code pattern of said signal with the predetermined sensible characteristic code pattern of said stored items of coded information,
   E. means responsive to detection of a code pattern coincidence between said selected and said predetermined sensible characteristic code patterns for driving said register in a direction opposite to said one direction and by a predetermined increment of movement whereby said register is set by a predetermined amount from said remote location in response to transmission therefrom of a properly coded signal, and
   F. means operable in response to detection of a lack of coincidence between said selected and said predetermined sensible characteristic code patterns for disabling operation of said register driving means.

2. In combination:
   A. a metering device having a settable value indicating register and means responsive to operation of said metering device for driving said register in one direction indicative of a metering operation,
   B. means for receiving from a remote location a coded signal in the form of a series of discrete signal bits, each signal bit having a sensible characteristic which varies from selected other signal bits according to a selected code pattern,
   C. means in said metering device for storing coded information in the form of a corresponding series of discrete information bits, each information bit having a sensible characteristic which varies from selected other information bits according to a predetermined code pattern,
   D. means for successively detecting variations in the sensible characteristics of said signal bits and said stored information bits and for comparing, bit by bit, the selected sensible characteristic code pattern of said signal with the predetermined sensible characteristic code pattern of said stored information,
   E. means responsive to detection of a code pattern coincidence between said selected and said predetermined sensible characteristic code patterns of said series of signal bits and said series of information bits for driving said register in a direction opposite to said one direction and by a predetermined increment of movement whereby said register is set by a predetermined amount from said remote location in response to transmission therefrom of a properly coded signal, and
   F. means operable in response to detection of a lack of coincidence between the sensible characteristics of any signal bit and a corresponding information bit for disabling operation of said register driving means regardless of subsequent coincidence between the sensible characteristics of a signal bit and its corresponding information bit.

3. In combination:
   A. a metering device having a settable value indicating register and means responsive to operation of said metering device for driving said register in one direction indicative of a metering operation, B. means for receiving from a remote location a coded signal in the form of a series of discrete signal bits, each signal bit having a sensible characteristic which varies from selected other signal bits according to a selected code pattern, C. an information storage element in said metering device for storing coded information in the form of a series of information bits, each information bit having a sensible characteristic which varies from selected other information bits according to a predetermined code pattern, D. signal sensing means operatively connected to said signal receiving means and information sensing means operatively associated with said information storage element for detecting variations in the sensible characteristics of said signal bits and said information bits respectively, E. means connected to both said signal sensing means and said information sensing means for comparing the sensible characteristics of said signal bits and said information bits, F. means operable in response to detection by said comparing means of coincidence between the sensible characteristic of each successive signal bit and a corresponding information bit for effecting incremental relative movement between said information storage element and said information sensing means whereby successive information bits of said series thereof are brought into operative relationship with said information sensing means, G. Means responsive to completion of said relative movement between said information storage element and said information sensing means for said series of signal bits and information bits for driving said register in a direction opposite to said one direction and by a predetermined increment of movement whereby said register is set by a predetermined amount from said remote location in response to transmission therefrom of a properly coded signal, and H. means operable in response to detection by said comparing means of a lack of coincidence between the sensible characteristics of any one information bit of a series and its corresponding signal bit to disable further operation of said means for effecting said relative movement whereby subsequent coincidence between the sensible characteristics of said one information bit and any signal bit is ineffective to resume operation of said means for effecting relative movement.

4. In combination:

A. a metering device having a settable value indicating register and means responsive to operation of said metering device for driving said register in one direction indicative of a metering operation, B. means operatively associated with said metering device for receiving from a remote location a coded signal in the form of a series of discrete signal bits, each signal bit having a sensible characteristic which varies from selected other signal bits according to a selected code pattern, C. an information storage element movably mounted in said metering device for storing coded information in the form of a series of spaced information bits, each information bit having a sensible characteristic which varies from selected other information bits according to a predetermined code pattern, D. signal sensing means operatively connected to said signal receiving means and information sensing means operatively associated with said information storage element for detecting variations in the sensible characteristics of said signal bits and said information bits respectively, E. means connected to both said signal sensing means and said information sensing means for comparing the sensible characteristics of said signal bits and said information bits, F. means operable in response to detection by said comparing means of coincidence between the sensible characteristics of each successive signal bit and a corresponding information bit for moving said information storage element relative to said information sensing means in increments corresponding to the spacing between successive information bits whereby said successive information bits are brought into operative relationship with said information sensing means only upon detection of coincidence between a preceding information bit and its corresponding signal bit, and G. drive means operatively connected to said means for moving said information storage element, and responsive to completion of movement of said storage element for said series of signal bits and information bits, for driving said register in a direction opposite to said one direction and by a predetermined increment of movement, said drive means including motion accumulating means for accumulating the incremental movements of said information storage element and for transferring a driving movement to said register in response to the final incremental movement of said storage element for said series of information bits and signal bits whereby said register is set by a predetermined amount from said remote location in response to transmission therefrom of a properly coded signal.

5. A combination according to claim 4 wherein:

A. said value indicating register comprises
1. a plurality of counter wheel subassemblies, and
2. transfer drive means interconnecting adjacent subassemblies for transferring accumulated rotary movement from a subassembly of lower numerical value to a subassembly of higher numerical value, B. said register drive means responsive to operation of said metering device being connected to the subassembly of lowest numerical value, and C. said last named register drive means is connected to the subassembly of highest numerical value in a manner so as to drive said subassembly in a direction opposite to that in which said subassembly of highest numerical value is driven by the adjacent subassembly of lower numerical value through said transfer drive means.

6. A combination according to claim 4 wherein:

A. said information storage element is a flexible tape having said series of information bits thereon in the form of spaced sensible indicia, and B. said means for moving said information storage element comprises
1. tape feeding means having an output connected to said last named register drive means,
2. intermittently operable actuating means for driving said tape feeding means in said increments of movement corresponding to said spacing of said indicia, and
3. means connecting said actuating means with said signal sensing means and said comparing means for successively operating said actuating means upon receipt of successive signal bits which coincide with corresponding information bits as determined by said comparing means.

7. A combination according to claim 6 wherein said actuating means for said tape feeding means comprises:

a. a ratchet driving mechanism connected to said tape feeding means, b. spring means for operating said ratchet driving mechanism in a tape feeding direction, and c. a solenoid operatively associated with said ratchet driving mechanism for cocking the latter when the solenoid is energized whereby said ratchet driving mechanism is cocked by said solenoid upon receipt of a signal through said connecting means and is released for movement by said spring means upon termination of said signal and deenergization of said solenoid.

8. A combination according to claim 7 wherein said connecting means includes means responsive to detection of lack of coincidence between the sensible characteristic of any signal bit and a corresponding information bit for disabling further operation of said solenoid in response to receipt of subsequent signals from said signal sensing means.

9. A combination according to claim 4 wherein:
A. the sensible characteristic of said signal is constituted by its frequency which varies from bit to bit between two predetermined frequencies according to said selected code pattern, and
B. said signal sensing means comprises
1. a pair of frequency filters connected in parallel to said signal receiving means, each filter being tuned to pass a signal bit having only one of said predetermined frequencies,
2. the output of each filter being connected in parallel to said comparing means and to said means for moving said information storage element.

10. A combination according to claim 9 wherein said means for moving said information storage element includes
1. means operable in response to receipt of a signal from said signal sensing means for causing operation of said means for moving said information storage element, and
2. means operable in response to detection by said comparing means of a lack of coincidence between the sensible characteristic of a signal bit and a corresponding information bit for preventing further operation of said means for moving said information storage element.

11. A combination according to claim 9 wherein:
A. said information storage element is a flexible tape having said series of information bits thereon in the form of spaced sensible indicia, and
B. said means for moving said information storage element comprises
1. tape feeding means having an output connected to said last named register drive means,
2. actuating means for driving said tape feeding means in said increments of movement corresponding to said spacing of said indicia,
3. a power source for said actuating means, and
4. switch means connected to said filters and responsive to a signal therefrom for connecting said power source to said actuating and responsive to termination of said signal for disconnecting said power source from said actuating means.

12. In combination:
A. a metering device having a settable value indicating register and first drive means responsive to operation of said metering device for driving said register in one direction indicative of a metering operation,
B. means operatively associated with said metering device for receiving from a remote location a coded signal in the form of a series of discrete signal bits each having one of two predetermined frequencies, the order of frequencies of said series of signal bits varying between said predetermined frequencies according to a selected code pattern,
C. an information storage element movably mounted in said metering device for storing coded information in the form of a series of spaced information bits, each information bit having one of two sensible characteristics, the order of occurrence of the sensible characteristics of said series of information bits varying according to a predetermined code pattern,
D. signal sensing means comprising a pair of frequency filters connected in parallel to said signal receiving means, each filter being tuned to pass a signal bit having only one of said predetermined frequencies,
E. information sensing means comprising scanning means operatively associated with said information storage element for successively detecting the variations in the sensible characteristics of said information bits as said storage element is moved past said scanning means,
F. comparing means comprising switch means having a pair of terminals each connected to the output of said frequency filters and a switch element movable between said terminals in response to sensing of the characteristics of said information bit by said scanning means, said comparing means providing a disable signal in response to a lack of coincidence between said signal and information bits,
G. means for driving said information storage element, said driving means being connected to the output of said frequency filters in parallel with said comparing means,
H. an electric power source for said means for driving said information storage element,
I. first switch means responsive to receipt of a signal bit from one of said filters for connecting said power source to said driving means for said information storage element and for disconnecting said power source from said driving means upon termination of said signal bit,
J. second switch means responsive to said disable signal from said comparing means for disabling said power source for further operation, and
K. drive means connected to the output of said driving means for said information storage element and including motion accumulating means for transmitting a driving movement to said register in response to completion of movement of said information storage element and in a direction opposite to said one direction whereby said register is set by a predetermined amount from said remote location in response to transmission therefrom of a properly coded signal and is disabled for further operation in response to transmission therefrom of an improperly coded signal.

13. In combination:
A. a metering device having a settable value indicating register and means responsive to operation of said metering device for driving said register in one direction indicative of a metering operation,
B. means for receiving from a remote location a coded signal having a variable sensible characteristic which varies according to a selected code pattern.
C. means in said metering device for storing coded information having a variable sensible characteristic which varies according to a predetermined code pattern, said coded information including a plurality of discrete items of information, each item having a sensible characteristic code pattern which differs from that of the other items according to a predetermined random pattern,
D. means for detecting variation in the sensible characteristics of said signal and said stored items of coded information and for comparing the selected sensible characteristic code pattern of said signal with the predetermined sensible characteristic code patterns of said stored items of coded information, and
E. means responsive to successive detection of a sensible characteristic code pattern coincidence between said plurality of items of information and a corresponding plurality of said coded signals whereby said register is settable a corresponding plurality of times in response to receipt of signals having selected sensible characteristics code patterns which differ according to said predetermined random pattern.